(12) United States Patent
Gibbs

(10) Patent No.: US 7,770,483 B2
(45) Date of Patent: Aug. 10, 2010

(54) POWER TRAIN FOR AN AMPHIBIOUS VEHICLE

(75) Inventor: Alan Timothy Gibbs, London (GB)

(73) Assignee: Gibbs Technologies Limited (GB)

( * ) Notice: Subject to any disclaimer, the term of this patent is extended or adjusted under 35 U.S.C. 154(b) by 1076 days.

(21) Appl. No.: 11/480,142

(22) Filed: Jun. 30, 2006

(65) Prior Publication Data

US 2009/0004931 A1   Jan. 1, 2009

Related U.S. Application Data

(62) Division of application No. 10/363,012, filed on Jul. 15, 2003, now Pat. No. 7,089,822.

(30) Foreign Application Priority Data

Aug. 30, 2000   (GB)   .................................   0021171.4

(51) Int. Cl.
*B60F 3/00*   (2006.01)
(52) U.S. Cl. .................... 74/339; 74/15.82; 440/12.51; 440/12.66
(58) Field of Classification Search .................... 74/339, 74/15.6, 15.82; 440/12.5, 12.51, 12.52, 12.53, 440/12.54, 12.66
See application file for complete search history.

(56) References Cited

U.S. PATENT DOCUMENTS

| 1,550,344 | A | | 8/1925 | Copes |
| 1,641,574 | A | * | 9/1927 | Chavez ..................... 440/12.52 |
| 3,114,347 | A | * | 12/1963 | Trippel et al. ............ 440/12.59 |
| 3,362,373 | A | | 1/1968 | Mycroft |
| 3,756,185 | A | | 9/1973 | Breslin |
| 3,785,325 | A | | 1/1986 | Mycroft |
| 4,562,897 | A | | 1/1986 | Renneker |
| 5,531,179 | A | | 7/1996 | Roycroft et al. |
| 6,773,315 | B2 | | 8/2004 | Roycroft |
| 6,881,107 | B2 | | 4/2005 | Roycroft |
| 6,883,457 | B2 | | 4/2005 | Lipscombe et al. |
| 6,957,991 | B2 | * | 10/2005 | Gibbs ...................... 440/12.51 |

(Continued)

FOREIGN PATENT DOCUMENTS

DE   1530577   5/1965

(Continued)

OTHER PUBLICATIONS

Over land and water—high speed amphibian—Design and Components in Engineering, Sep. 14, 1967.

*Primary Examiner*—Ha D. Ho
(74) *Attorney, Agent, or Firm*—Fulwider Patton LLP

(57) ABSTRACT

A power train for an amphibious vehicle includes an engine and transaxle arranged North-South, driving front, rear, or all four road wheels. A power take off with optional decoupler and constant velocity joint drives marine drive means. The power take off may be taken from the input shaft of the transmission, and may use a synchronizer. The transaxle includes a differential. The rear wheels may be set back from the differential outputs, with intermediate drive by chains or belts. A sandwich type power take off may also be used. In the four wheel drive embodiment, a power take off is required from the rear differential. Decouplers may be provided in at least one wheel drive shaft on each driven axles.

21 Claims, 7 Drawing Sheets

U.S. PATENT DOCUMENTS 7,011,557 B2 * 3/2006 Gibbs .................. 440/12.51

FOREIGN PATENT DOCUMENTS

| | | |
|---|---|---|
| DE | 1992 6145 A1 | 9/1999 |
| EP | 0341009 A1 | 11/1989 |
| GB | 142120 | 7/1921 |
| GB | 184294 | 8/1922 |
| GB | 350257 | 12/1930 |
| GB | 2134857 A | 8/1984 |
| WO | WO 02/07999 A1 | 1/2002 |
| WO | WO 02/18161 A1 | 3/2002 |
| WO | WO 02/060707 A1 | 8/2002 |

* cited by examiner

POWER TRAIN FOR AN AMPHIBIOUS VEHICLE

RELATED APPLICATIONS

This is a divisional application of U.S. Ser. No. 10/363,012 filed Jul. 15, 2003, which is based on International Application PCT/GB01/03768 filed on Aug. 23, 2001 which claims priority of GB0021171.4 dated Aug. 30, 2000.

The present invention relates to a power train which is particularly suitable for use in an amphibious vehicle capable of travel on land and water, and more particularly to a means of adapting a conventional automotive transaxle drive arrangement to d rive the wheels and the marine propulsion means of an amphibious vehicle. The invention also relates to an amphibious vehicle having such a power train.

In some automotive power train arrangements the engine has a crankshaft in line with the longitudinal axis of the vehicle, whereby the engine drives an in-line transmission with an integral differential which is typically located between the engine and the transmission, the differential being connected by drive shafts to the drive wheels of the vehicle. This arrangement is commonly known as a transaxle drive and has been employed in front engine, rear engine and mid engine power train layouts.

It is also known for transaxle power train arrangements to be adapted to provide four wheel drive. In such known four wheel drive arrangements, the transaxle will typically drive the front wheels of the vehicle, with a power take off from the transmission driving the rear wheels of the vehicle.

The transaxle drive arrangement is currently used by several large car manufacturers in the production of private passenger vehicles and is therefore produced in relatively high volumes, which makes the arrangement most procurable for use in an amphibious vehicle. In choosing a power train for a specialised low volume production vehicle, such as an amphibious vehicle, availability is an important factor.

EP 0 742 761 discloses a power train for an amphibious vehicle using a front wheel drive power train reversed, to mount the engine behind the rear axle. The marine power take off is by a gearbox taken from the timing end of the engine, opposite to the transmission mounting end. This power take off requires a number of custom designed parts to be designed, built, and assembled; and may require redesign and relocation of engine mounted accessories, such as the alternator drive belt. Also, the reversal of the power train may require additional gearing or other modifications to ensure that the road wheels rotate in the required and expected directions. The cost burdens and assembly requirements of such adaptations are particularly unwelcome to low volume vehicle manufacturers.

It is an object of the present invention to provide a power train for an amphibious vehicle in which a conventional transaxle drive is utilised and adapted to drive at least one pair of road wheels and a marine propulsion means.

According to a first aspect of the invention, there is provided power train for an amphibious vehicle comprising an engine and transaxle drive arranged in North-South alignment, that is with the front or timing end of the engine facing the front of the vehicle and with the engine in longitudinal alignment with the vehicle axis, the transaxle drive including a transmission and differential, the differential being adapted to provide drive to a pair of driven wheels of the vehicle, the power train further comprising a power take off adapted to provide drive to a marine propulsion means.

Preferably, the power take off is provided by means of a drive shaft connectable to an input shaft of the transmission.

In a particularly preferred embodiment, the drive shaft is selectively connectable to the input shaft by means of a decoupler which may have means, such as a baulk ring, adapted to synchronize the speeds of the input shaft and the drive shaft as the shafts are coupled. Conveniently, the decoupler may comprise a gear wheel and synchro-mesh unit.

Alternatively, the power take off may comprise a sandwich power take off between the engine and the transaxle, which power take off provides drive to the marine propulsion means. Drive may be transmitted from the sandwich power take off to the marine propulsion unit by means of a prop shaft which may be connected to a drive shaft of the marine propulsion unit by a constant velocity joint.

In one embodiment, each wheel of the pair of the driven wheels is driven by an output shaft of the differential, the arrangement being such that the axis of rotation of the pair of driven wheels is offset along the length of the vehicle from the axis of rotation of the output shafts of the differential. In such an arrangement, drive may be transmitted between each said driven wheel and its respective differential output shaft via a chain or belt drive means. Preferably, the chain or belt drive means comprises a first sprocket mounted to the differential output shaft, a second sprocket mounted to a wheel drive shaft and a belt or chain interconnecting the two sprockets to transmit drive between the output shaft and the wheel drive shaft.

The power take off may provide drive only to the marine propulsion means or may provide drive to a second differential for driving a further pair of road wheels, with the drive to the marine propulsion unit being taken from the second differential. In an alternative arrangement for providing a four wheel drive facility, where the power take off is a sandwich power take off, a further power take off adapted to drive a further pair of wheels of the vehicle may also be provided. Preferably, the further power take off is provided by means of a shaft which is drivingly connectable to the transmission at a rearward end thereof, the shaft being adapted to drive a further differential for driving the further pair of wheels of the vehicle.

In all embodiments of the invention, the power train may be adapted such that the centre lines of the engine, transaxle, and marine propulsion unit are substantially aligned with each other and with the centre line or longitudinal axis of the vehicle.

Preferably, the or each power take off is arranged rearward of the engine.

According to a second aspect of the invention, there is provided an amphibious vehicle having a power train in accordance with the first aspect.

Several embodiments of the invention will now be described, by way of example only, with reference to the accompanying drawings, in which.

Figure 12:
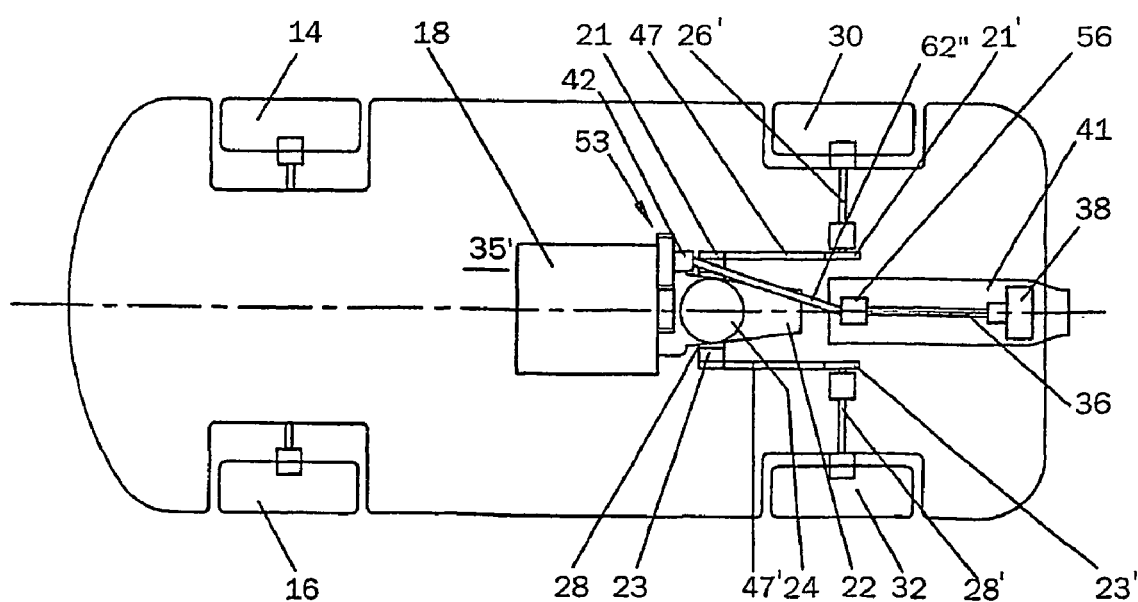
Figure 13:
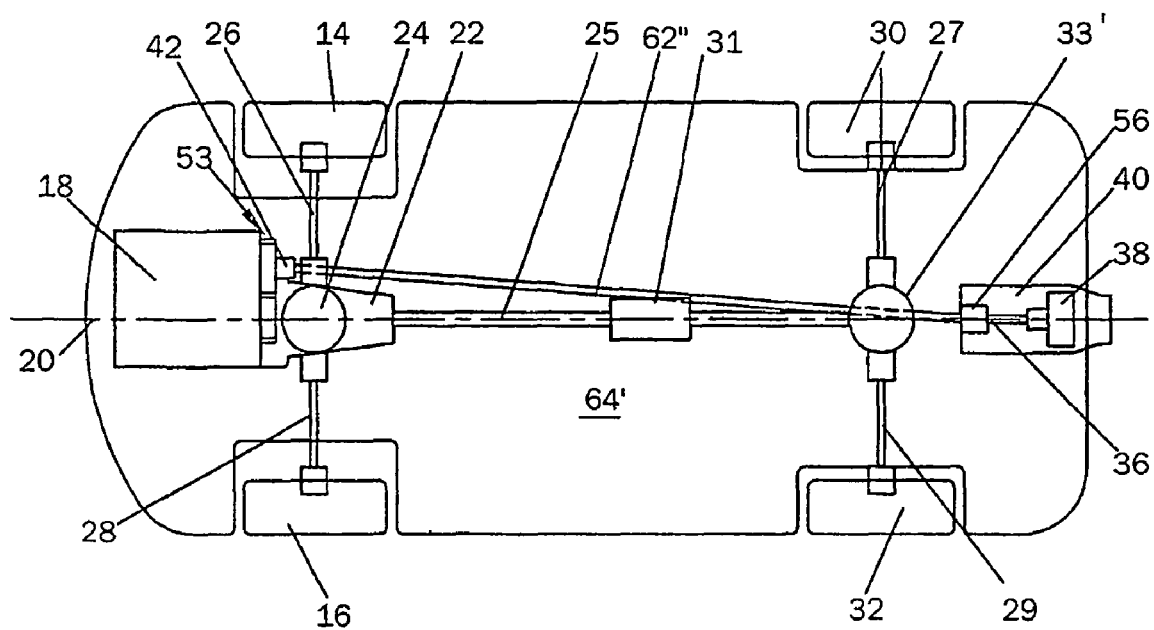

FIG. 12 is a plan view of an seventh embodiment of a power train for an amphibious vehicle in accordance with the invention, in which the power train is again adapted to drive the rear wheels and the marine propulsion means of an amphibious vehicle; and FIG. 13 is a plan view of a eighth and final embodiment of a power train for an amphibious vehicle in accordance with the invention, in which the power train is adapted to drive all four wheels and the marine propulsion means of an amphibious vehicle.

The same reference numerals have been used throughout the drawings to denote common components.

Figure 1:
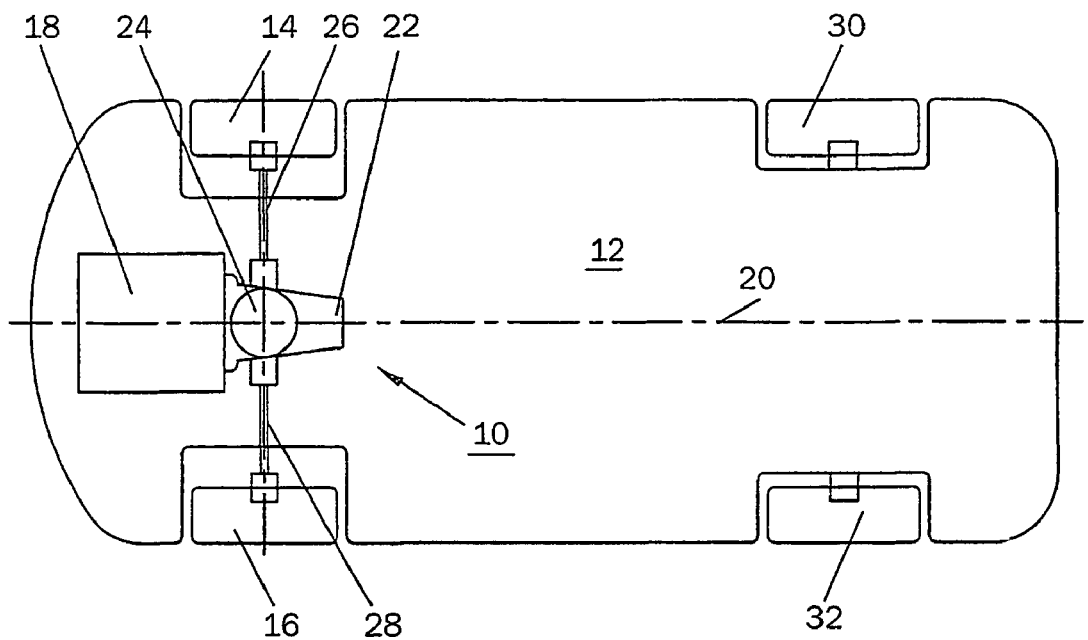
FIG. 1 is a plan view of a conventional power train arrangement including a longitudinal engine, and a transmission and differential in a transaxle arrangement for driving the front wheels of a vehicle.

Referring firstly to FIG. 1, a conventional transaxle drive arrangement, generally indicated at 10, is shown driving the front wheels 14,16 of a vehicle 12. An engine 18 is conventionally positioned forward of the front wheels 14,16 with the crankshaft of the engine 18 in axial alignment with the centre line, chain dotted at 20, of the vehicle 12. A transmission 22 is mounted in line with the engine 18 and drives a differential 24. Drive shafts 26,28 drive the front wheels 14,16 of the vehicle from the differential 24. The rear wheels 30,32 of the vehicle 12 are not driven.

Figure 2:
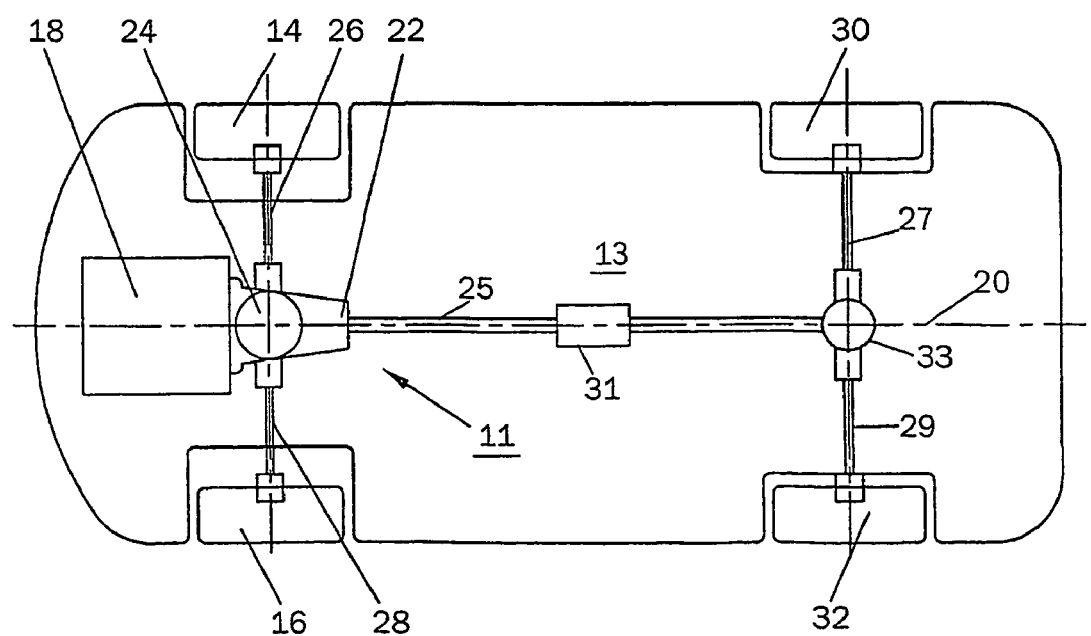
FIG. 2 is a plan view of a conventional power train arrangement including a longitudinal engine, and a transmission and differential in a transaxle arrangement adapted for driving all four wheels of a vehicle.

A second conventional transaxle arrangement 11 for a vehicle 13 will now be described with reference to FIG. 2. Engine 18, transmission 22, and differential 24 are arranged to drive front wheels 14,16 through drive shafts 26,28 as in the arrangement of FIG. 1. In this case, however, a power take off is located at the rear of transmission 22, driving centre differential 31 and rear differential 33. Drive shafts 27 and 29 drive rear wheels 30 and 32 respectively. This arrangement is a convenient way of offering a four wheel drive transmission in combination with a "North-South" mounted engine and transaxle as shown.

The term "North-South" will be understood by those skilled in the art to indicate a vehicle power train in which the engine is mounted so that the axis of the crankshaft is in alignment with or parallel to the axis of the vehicle and in which the front end of the engine, usually the timing end, faces towards the front of the vehicle. The term should be interpreted in this sense throughout the description and/or claims.

A first embodiment of the invention will now be described with reference to FIGS. 3 and 4. A North-South mounted engine 18 and in line transmission 22 are positioned at the rear of an amphibious vehicle 34, with the crankshaft of the engine 18 in axial alignment with the axis 20 of the vehicle 34 and the front or timing end of the engine facing towards the front of the vehicle. The engine 18 is positioned forward of the centre line of the rear wheels 30,32, and the transmission 22 drives a differential 24 in a transaxle arrangement, as described with reference to FIG. 1. Drive shafts 26,28 drive the rear wheels 30,32 of the vehicle 34 from the differential 24.

Decouplers 43, 45 are provided in the drive line between the differential 24 and the driven road wheels 14, 16. The decouplers 43,45 enable drive to the driven wheels to be decoupled when the vehicle is operated in marine mode. Alternatively, rather than providing a decoupler 43, 45 in the drive line between the differential and each driven wheel, a decoupler may be provided in the drive line between the transaxle and only one of the driven wheels 14, 16 or they may be omitted altogether.

Figure 4:
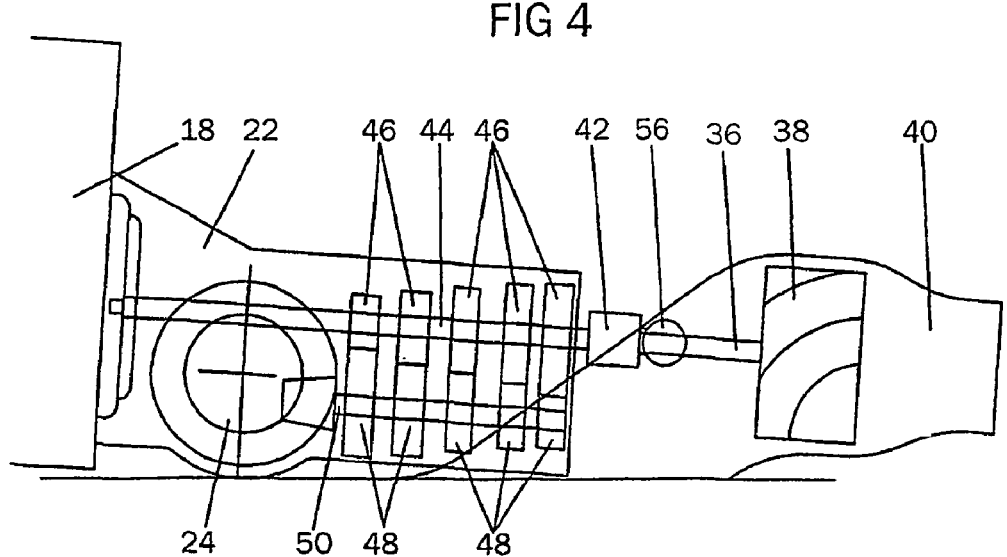
FIG. 4 shows a schematic section through the transaxle arrangement for driving the rear wheels and marine propulsion means of the amphibious vehicle as shown in FIG. 3.

As is best seen in FIG. 4, a power take off is provided on the transmission to drive a marine propulsion means in the form of a water jet 40. An impeller shaft 36 drives an impeller 38 of the water jet 40 from the transmission 22. The impeller shaft 36 can be selectively coupled to an extension of the input shaft 44 of the transmission by a decoupler 42. Gears 46 mounted to the shaft 44 are engaged in known manner with corresponding gears 48 mounted on an output shaft 50, which drives the differential 24. The gears 46 and corresponding gears 48 provide the gear ratios of the transmission 22.

In a preferred embodiment the decoupler 42 which selectively couples the input shaft 44 of the transmission to the impeller drive shaft 36 has means which are adapted to synchronise the speeds of the shafts as they are coupled. For example, the decoupler may be of the type disclosed in the applicants co-pending International patent application PCT/GB01/03493 which comprises a baulk ring for synchronizing the speeds of the shafts.

A modification to the first embodiment will now be described in relation to FIGS. 5 and 6.

Figure 5:
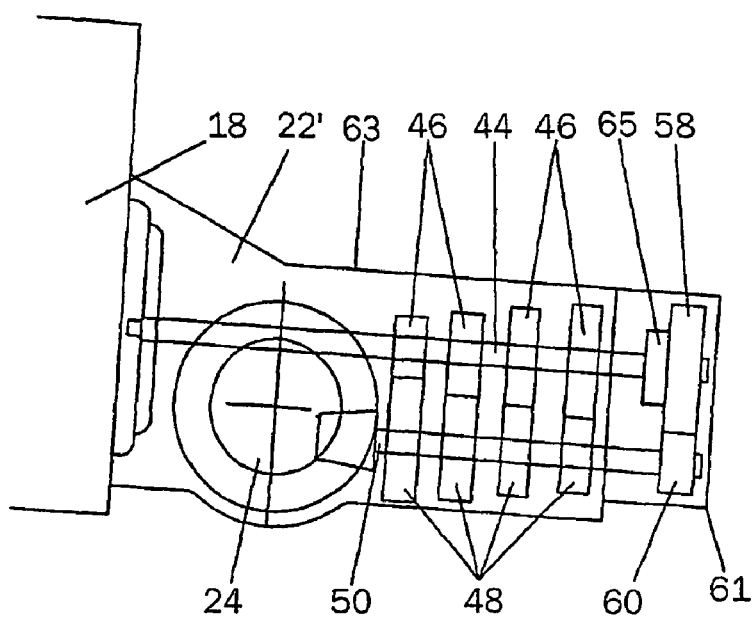
FIG. 5 shows a schematic section through a prior art transaxle where the fifth gear is in a separate compartment to the other four gears.

FIG. 5 shows a conventional transaxle 22' in which a fifth speed is provided by an 'overhung' pair of constant mesh gears 58,60 which are positioned in a separate compartment 61, adjacent to the main compartment 63 of the transaxle 22'. A synchro-mesh unit 65 is employed to couple the drive gear 58 to the input shaft 44 whereby the drive gear 58 and the driven gear 60 may drive the output shaft 50 and thus the differential 24. Similar synchro-mesh units (not shown) are conveniently employed to couple and decouple the gears 46 and 48 in the main compartment 63.

Figure 3:
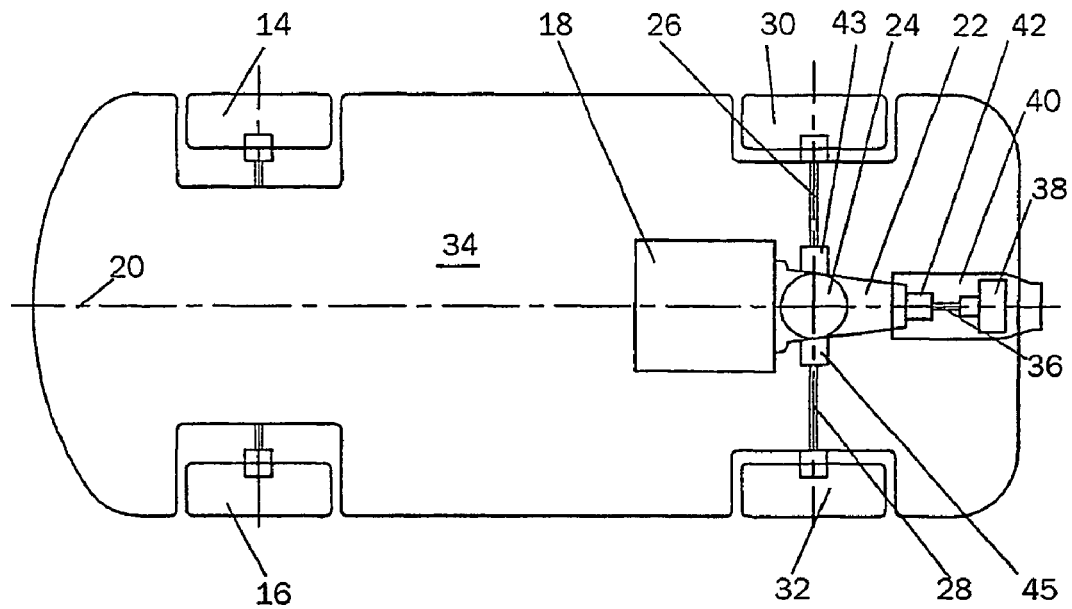
FIG. 3 is a plan view of a power train for an amphibious vehicle in accordance with the present invention, in which the power train is adapted to drive the rear wheels and the marine propulsion means of an amphibious vehicle.
Figure 6:
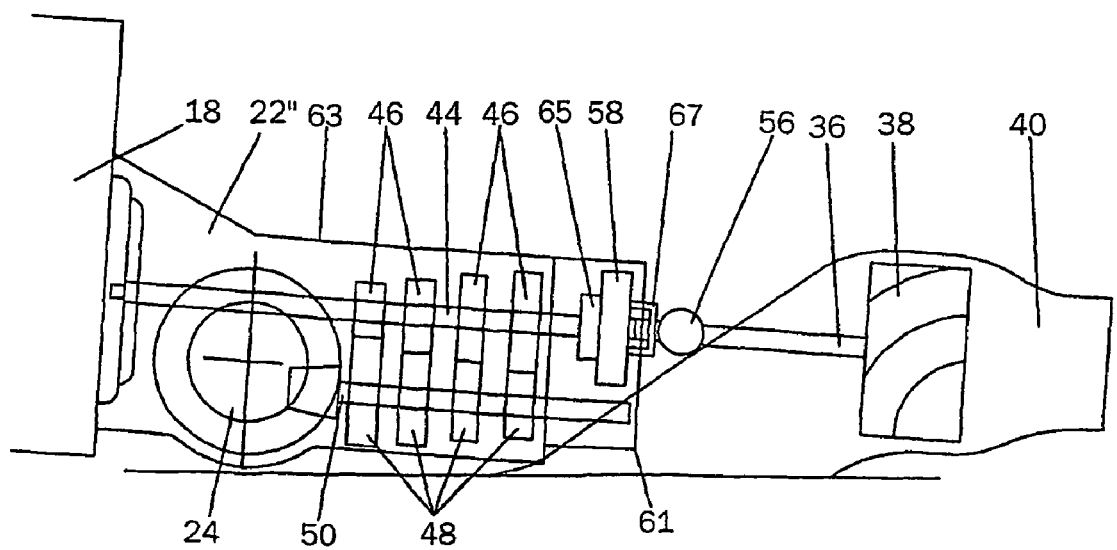
FIG. 6 Shows a modification to the power train of FIG. 3, in which the transaxle of FIG. 5 is adapted to provide an alternative power take off arrangement.

FIG. 6 shows how the transaxle 22' of FIG. 5 can be modified to provide a power take off for use in the power train of FIG. 3. In the modified transaxle 22" the driven gear 60 has been removed from the output shaft 50 whereby the fifth speed of the transaxle 22' will no longer be available to drive the rear wheels 30, 32 of the vehicle 34. However, the drive gear 58 may still be coupled to the input shaft 44 by the synchro-mesh unit 65, such that by coupling the fifth gear axially to the impeller shaft drive shaft 36, as shown at 67, drive to the water jet 40 may be provided in a manner similar to that described above in relation to FIG. 4, with the synchro-mesh unit 65 acting as a decoupler.

This modified arrangement provides an advantage over the arrangement of FIG. 4, in that the existing coupling system of synchro-mesh unit 65 may be employed as a decoupler in place of the additional decoupler 42 used in FIG. 4.

The modified power take off arrangement can of course be used with any transaxle in which a pair of overhung gears are located in a separate compartment of the transaxle. For example where the transaxle has a sixth speed gear in a separate compartment, the sixth speed gear can be used to provide the power take off as described above.

Whilst preferred forms of the power take off have been described, it will be understood by those skilled in the art that any suitable form of power take off can be used to drive the water jet 40 from the transmission.

Figure 7:
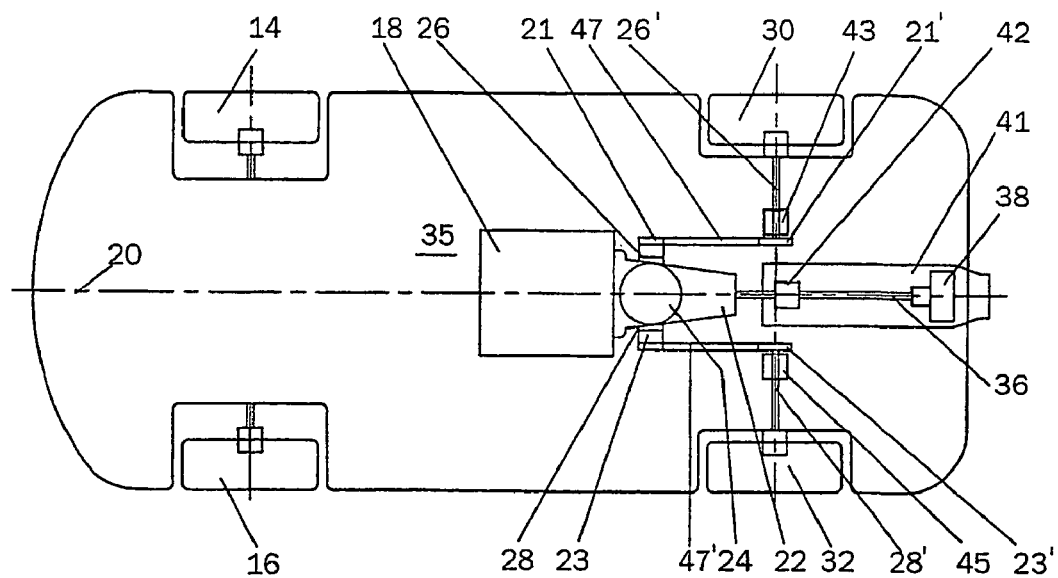
FIG. 7 is a plan view of a second embodiment of a power train for an amphibious vehicle in accordance with the invention, in which the power train is adapted to drive the rear wheels and the marine propulsion means of an amphibious vehicle.

FIG. 7 shows a second embodiment of the invention. The arrangement is similar to that of the first embodiment except that the engine 18 and transmission 22 have been moved forward in the vehicle to accommodate a longer jet drive 41. The differential 24 has output drive shafts 26, 28 on which are mounted sprockets 21, 23. The sprockets 21, 23 drive corresponding sprockets 21', 231 on offset wheel drive shafts 26', 28' by means of a belt or chain 47, 47'. This arrangement permits drive to be transmitted between the differential 24 and the driven wheels 30,32 whose axis of rotation is offset along the length of the vehicle from the axis of rotation of the output shafts 26, 28 of the differential.

A decoupler 43, 45 is fitted in the drive line between the differential and each of the driven rear wheels 30, 32 in order that drive to the wheels can be disconnected when the vehicle is used in a marine mode. In the present embodiment a decoupler 43, 45 is fitted in each of the wheel drive shafts 26', 28' but it will be appreciated that the decouplers could be fitted in the differential output shafts 26, 28 instead. Alternatively only a single decoupler can be used in the drive path between the differential and one of the wheels. Where a single decoupler is used to disconnect drive between the differential and one of the driven wheels 30, 32, the corresponding wheel pinion in differential 24 will spin without transmitting power, while the other pinion will not be driven. If it is found in practice that the other wheel drive shaft rotates, through transmission oil drag or whatever other reason, it may be locked by use of the vehicle handbrake.

Figure 8:
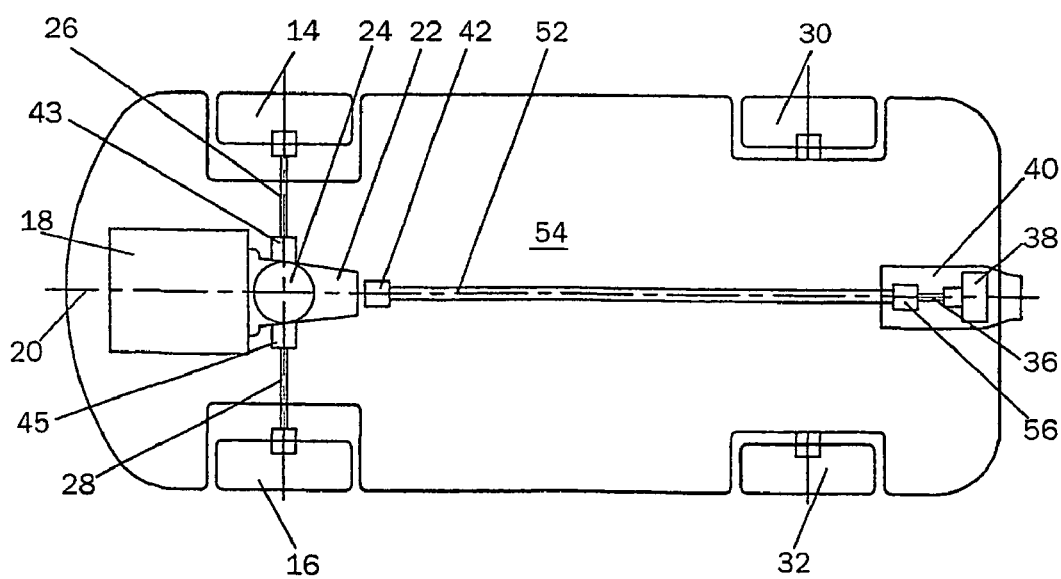
FIG. 8 is a plan view of a third embodiment of a power train for an amphibious vehicle in accordance with the invention, in which the power train is adapted to drive the front wheels and the marine propulsion means of an amphibious vehicle.

In a third embodiment of the invention, shown in FIG. 8, the engine 18 of an amphibious vehicle 54 is mounted in the conventional position for a transaxle front wheel drive arrangement, that is forward of the centre line of the front wheels 14,16. The front wheels 14,16 are driven by drive shafts 26,28 with at least one decoupler 43, 45 as described with reference to FIG. 3. A propeller shaft 52 is connected to a decoupler 42, which is driven by the conventional input drive shaft 44 of the transmission 22. The propeller shaft 52 is coupled to the input shaft by means of the decoupler 42 in a manner similar to way in which the impeller shaft 36 is connected to the input shaft in the FIG. 4 embodiment. Alternatively, the propeller shaft 52 may connected to the input shaft by use of a fifth or sixth speed gear and synchro-mesh unit as described above in relation to FIGS. 5 and 6. The propeller shaft 52 runs axially of the vehicle 54 and is connected to the impeller shaft 36 by means of a constant velocity joint 56. The impeller shaft 36 drives the impeller 38 of the water jet 40, positioned at the rear of the vehicle 54.

Figure 9:
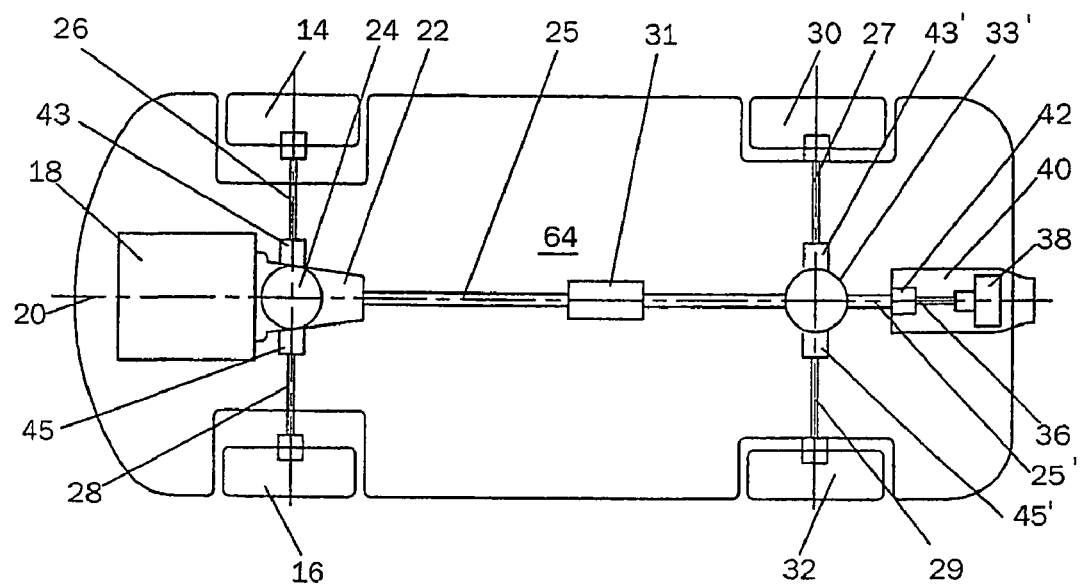
FIG. 9 is a plan view of a fourth embodiment of a power train for an amphibious vehicle in accordance with the invention, in which the power train is adapted to drive all four wheels and the marine propulsion means of an amphibious vehicle.

FIG. 9 shows a fourth embodiment of the invention, with all four road wheels of the vehicle 64 driven as well as a marine drive 40. It should be noted that in this embodiment, the jet drive may be geared down or up according to the gear ratios of the transmission 22; whereas in the embodiments of FIGS. 4 and 6, the jet is driven at crankshaft speed. This embodiment generally follows the road car layout of FIG. 2, but incorporates at least one decoupler 43, 45 for the front wheel drive shafts 26, 28, and at least one decoupler 43', 45', for rear wheel drive shafts 27,29. In this case, rear differential 33' incorporates a power take off to take drive rearwards to decoupler 42 and marine drive 40. It is not proposed to describe such a power take off in detail, because they are known in the power train art, for example for transmitting drive from the second to the third axle of a 6×6 truck. It is advantageous to use independent rear suspension with this layout, as this will allow differential 33' to maintain a consistent position relative to water jet 40. This in turn avoids any need for articulation of rearward drive shaft 25', which would be difficult to arrange satisfactorily in the short shaft length available.

Figure 10:
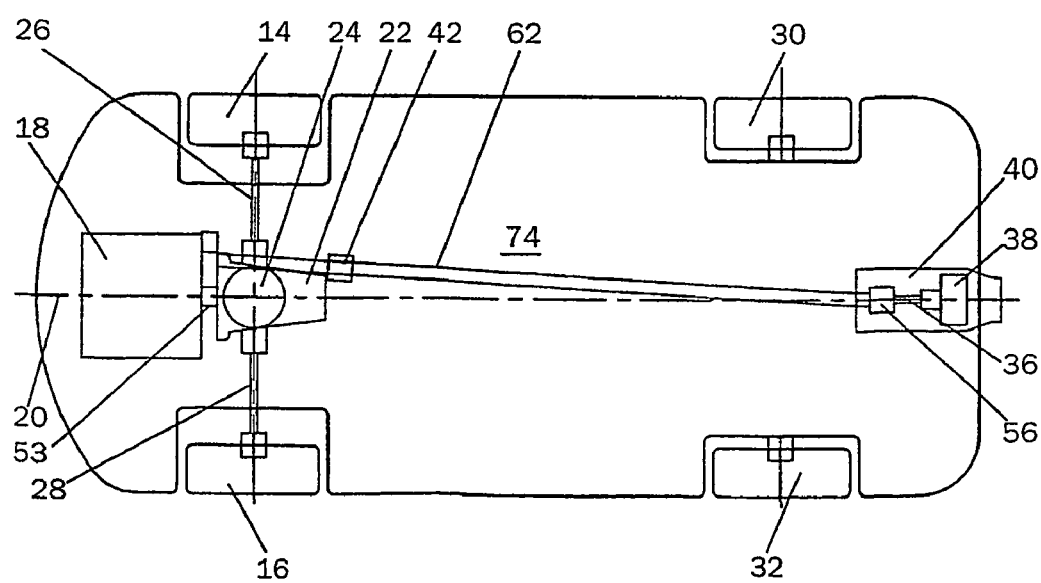
FIG. 10 is a plan view of a fifth embodiment of a power train for an amphibious vehicle in accordance with the invention, in which the power train is adapted to drive the front wheels and the marine propulsion means of an amphibious vehicle.

FIG. 10 shows a fifth embodiment of the invention, with front road wheels of the vehicle 74 driven as in the FIG. 8 embodiment, but with an alternative power take off device. Engine 18 is offset forward compared to the FIG. 8 embodiment, and a sandwich type power take off 53 is interposed between the engine and the transaxle. Sandwich power take off 53 will not be described in detail in the present application but may be constructed according to the applicant's co-pending British patent Application No. GB 0020884.3. The power take off 53 drives a propeller shaft 62, which is necessarily installed at a lateral angle to the vehicle centre line 20. A constant velocity joint 56 is fitted, to align the input drive of the water jet unit 40 with its output. Decoupler 42 may be fitted in the propeller shaft to enable the water jet drive to be disengaged during road driving. A further constant velocity joint (not shown) may be fitted at the front of the propeller shaft 62, adjacent to power take off 53. The further constant velocity joint may be combined with a decoupler, according to the applicant's co-pending International patent application No. PCT/GB01/03493, in which case the separate decoupler 42 can be omitted.

Figure 11:
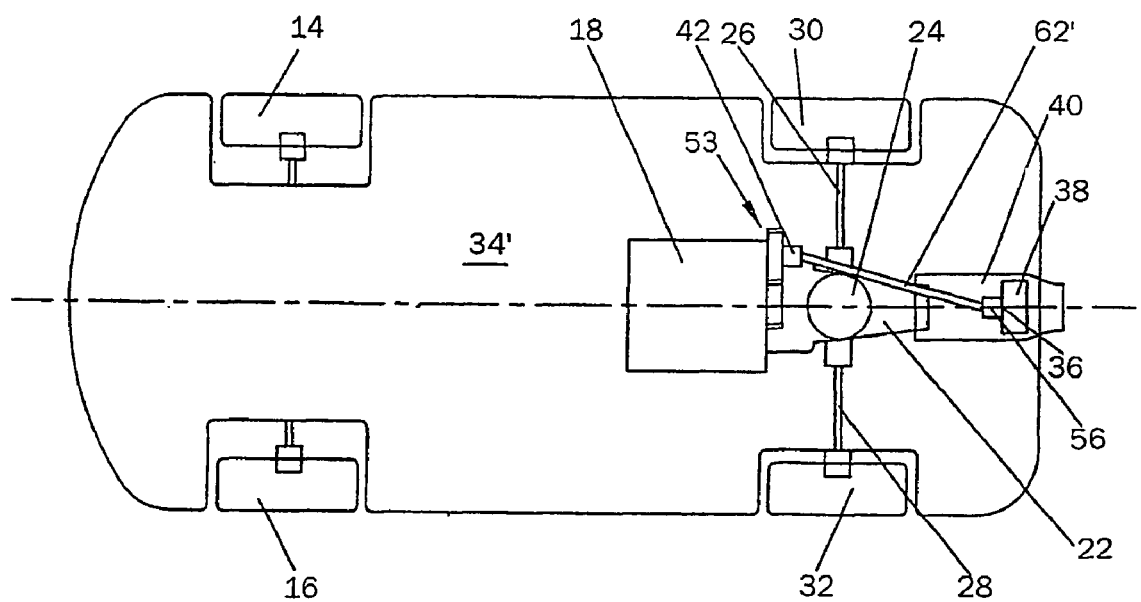
FIG. 11 is a plan view of a sixth embodiment of a power train for an amphibious vehicle in accordance with the invention, in which the power train is adapted to drive the rear wheels and the marine propulsion means of an amphibious vehicle.

FIG. 11 shows a sixth embodiment of the invention. This embodiment is similar to the first embodiment shown in FIG. 3, except that drive to the marine propulsion unit 40 is provided from a sandwich power take off 53 between the engine 18 and the transaxle. The sandwich power take off unit 53 is the same as that described above in respect of the fifth embodiment as shown in FIG. 10. Use of a sandwich power take off has the advantage that decoupler(s) are not required in the wheel drive shafts 26, 28, because the gearbox, whether manual or automatic, can be left in neutral gear when driving in marine mode. The sandwich power take off 53 drives the marine propulsion unit 40 by means of a prop shaft 62' which is connected to a drive shaft 36 of the marine propulsion unit by a constant velocity (CV) joint 56 because of the angle of shaft 62'. A second CV joint will be required adjacent to the power tale off. This may be combined with a decoupler 42 shown in FIG. 11. It will be noted here that drive shaft 36 is of vestigial length, for packaging reasons.

FIG. 12 shows a seventh embodiment of the invention, where the sandwich power take off arrangement described in relation to FIGS. 10 and 11 is applied to the power train layout of the second embodiment of the invention, as shown in FIG. 7.

FIG. 13 shows an eighth and final embodiment of the invention, where the sandwich power take off arrangement as shown in FIGS. 10 to 12 is applied to the power train layout of the fourth embodiment of the invention, as shown in FIG. 9. This layout is particularly advantageous in that it avoids the use of either two or four wheel drive shaft decouplers.

In each of the sandwich power take off embodiments described above in relation to FIGS. 10 to 13, a decoupler 42 is provided in the prop shaft adjacent to the power take off, and a CV joint 56 is incorporated in the marine propulsion unit. This is a preferred solution, because of control cable packaging; but it will be appreciated that the positions of CV joint and decoupler could be reversed if it is more convenient.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. For example, whilst it is preferred that the marine propulsion unit should be in the form of a water jet, any suitable marine propulsion means, such as a marine screw propeller, could be used.

The invention claimed is:

1. An amphibious vehicle having a plurality of road wheels and at least one marine propulsion unit, the vehicle being provided with an engine arranged to drive a gearbox having an output, wherein said engine is longitudinally oriented and positioned in front of said gearbox and said output is arranged to drive at least some of the road wheels and the marine propulsion unit wherein the output is arranged to drive the road wheels through a differential located between the engine and the gearbox.

2. The amphibious vehicle of claim 1, further comprising a decoupler between said gearbox output and said marine propulsion unit.

3. The amphibious vehicle of claim 2, further comprising a decoupler between said gearbox output and said road wheels driven thereby.

4. The amphibious vehicle of claim 1, further comprising a decoupler between said gearbox output and said road wheels driven thereby.

5. The amphibious vehicle of claim 1, wherein said amphibious vehicle has four road wheels.

6. The amphibious vehicle of claim 5, wherein all four of said road wheels are driven.

7. The amphibious vehicle of claim 1, wherein said gearbox and said marine propulsion unit are positionally fixed.

8. The amphibious vehicle of claim 7, wherein said roadwheels driven by said gearbox output are independently suspended.

9. The amphibious vehicle of claim 1, wherein said gearbox is associated with a transaxle which houses said differential.

10. The amphibious vehicle of claim 9, wherein said gearbox output drives road wheels through a second differential.

11. The amphibious vehicle of claim 10, wherein said marine propulsion unit is driven via a power takeoff from said second differential.

12. The amphibious vehicle of claim 11, wherein said second differential and said marine propulsion unit are positionally fixed.

13. The amphibious vehicle of claim 12, wherein said road wheels driven via said second differential are independently suspended.

14. The amphibious vehicle of claim 10, further comprising a center differential between said gearbox output and said second differential.

15. An amphibious vehicle having wheels and a marine propulsion unit rotationally driven by a longitudinally oriented engine via a variable ratio transmission, wherein said marine propulsion unit is driven by a driveshaft extending from one end of said transmission and said wheels are driven from the opposite end of said transmission, wherein both said wheels and said marine propulsion unit are drivable at selectable rotational speeds different from said engine's rotational speed and wherein said engine, marine propulsion unit and driveshaft are coaxially arranged along a common axis.

16. The amphibious vehicle of claim 15, further comprising a decoupler for between said transmission and said marine propulsion unit.

17. The amphibious vehicle of claim 15, further comprising a decouplers for selectively decoupling said wheels from said transmission.

18. The amphibious vehicle of claim 15, wherein said vehicle has a pair of front wheels and a pair of rear wheels and said engine is positioned in front of said rear wheels.

19. The amphibious vehicle of claim 18, wherein said engine is positioned in front of said front wheels.

20. The amphibious vehicle of claim 15, wherein said marine propulsion unit is driven by a non-articulating drive shaft.

21. The amphibious vehicle of claim 15, wherein said driveshaft extends from the rear of said transmission and said wheels are driven from the front of said transmission.

* * * * *